United States Patent [19]

Loontjens et al.

[11] Patent Number: 4,670,525
[45] Date of Patent: Jun. 2, 1987

[54] CATALYTIC TITANIUM COMPOUND, PROCESS FOR THE MANUFACTURE THEREOF, AND METHOD FOR THE POLYMERIZATION OF ALKENES-1 WITH APPLICATION OF SUCH A TITANIUM COMPONENT

[75] Inventors: Jacobus A. Loontjens, Meerssen; Denise J. L. Jacomen, Geleen, both of Netherlands

[73] Assignee: Stamicarbon B.V., Geleen, Netherlands

[21] Appl. No.: 428,705

[22] Filed: Sep. 30, 1982

Related U.S. Application Data

[63] Continuation of Ser. No. 135,690, Mar. 31, 1980, abandoned.

[30] Foreign Application Priority Data

Apr. 1, 1979 [NL] Netherlands ............... 7902535

[51] Int. Cl.$^4$ ............ C08F 4/02; C08F 10/00
[52] U.S. Cl. ................ 526/125; 502/104; 502/105; 502/119; 502/127; 526/142; 526/351; 526/906
[58] Field of Search ............ 252/429 B; 526/125; 502/104, 105, 127, 132, 119

[56] References Cited

U.S. PATENT DOCUMENTS

| | | | |
|---|---|---|---|
| 3,737,393 | 6/1973 | de Vries | 526/151 |
| 4,085,276 | 4/1978 | Toyota | 526/125 |
| 4,107,413 | 8/1978 | Giannini | 526/125 |
| 4,120,820 | 10/1978 | Birkelbach | 526/125 |
| 4,143,223 | 3/1979 | Toyota | 526/125 |
| 4,156,063 | 5/1979 | Giannini | 526/125 |
| 4,168,361 | 9/1979 | Oda et al. | 526/125 |
| 4,175,171 | 11/1979 | Ito et al. | 526/125 |
| 4,198,315 | 4/1980 | Birkelbach et al. | 526/115 |
| 4,252,670 | 2/1981 | Carent et al. | 526/125 |
| 4,464,478 | 8/1984 | Scata et al. | 526/125 |

FOREIGN PATENT DOCUMENTS

| | | | |
|---|---|---|---|
| 2738627 | 3/1978 | Fed. Rep. of Germany | 526/125 |
| 3012272 | 10/1980 | Fed. Rep. of Germany | 526/151 |

*Primary Examiner*—Edward J. Smith
*Attorney, Agent, or Firm*—Cushman, Darby & Cushman

[57] ABSTRACT

The invention relates to a catalytic titanium component useful for the polymerization of alkenes-1 and for the copolymerization of alkenes-1 with each other or with ethylene, containing a halogenated titanium compound, an electron donor, and a metal halide obtained by conversion of an organic metal compound with a halogenating agent of the formula $RX_m$, wherein R is a hydrocarbon group, a hydrogen atom or a halogen atom, X is a halogen atom, and m is a whole number from 1-10. The catalytic titanium component according to the invention is characterized in that the metal halide has been obtained by conversion of a combination of an organic aluminium compound and an organic magnesium compound with the halogenating agent into the corresponding metal halide, for instance by means of a reaction with hydrogen chloride or an alkyl chloride. The titanium component according to the invention considerably improves the activity and the stereospecificity of a catalyst system for the polymerization of alkenes-1, in particular propylene, and moreover a much purer polymer can be obtained.

21 Claims, No Drawings

CATALYTIC TITANIUM COMPOUND, PROCESS FOR THE MANUFACTURE THEREOF, AND METHOD FOR THE POLYMERIZATION OF ALKENES-1 WITH APPLICATION OF SUCH A TITANIUM COMPONENT

This is a continuation of application Ser. No. 135,690 filed Mar. 31, 1980 now abandoned.

The invention relates to a catalytic titanium component useful for the polymerization of alkenes-1 and for the copolymerization of alkenes-1 with each other or with ethylene, containing a halogenated titanium compound, an electron donor and a metal halide obtained by conversion of an organic metal compound with a halogenating agent of the formula $RX_m$, wherein R is a hydrocarbon group, a hydrogen atom or a halogen atom, X is a halogen atom, and m is a whole number of 1–10.

Such a titanium component is known from the Dutch 'Terinzagelegging' 7609722, which describes a catalyst system for the polymerization of alkenes-1 with a titanium component containing a halogenated titanium compound, an electron donor and a magnesium halide as carrier material, obtained, for instance, by conversion of an organic magnesium compound with silicon chloride. Instead of silicon chloride, also, for instance, a hydrogen halide, a halogenated hydrocarbon or a free halogen can be used as the halogenating agent. In polymerization, this catalytic titanium component is used in combination with, for instance, an organoaluminium component, such as a tri-alkyl aluminium compound or a di-alkyl aluminium halide. Such a catalyst system is only moderately active in polymerization of propylene or other alkenes-1, such as butylene-1, 4-methyl pentylene-1 and other alkenes-1, and also the stereospecificity and particularly the purity of the obtained polymer with respect to catalyst residues (particularly titanium and halogen) is unsatisfactory.

It has been found now that the activity and the stereospecificity of such a catalyst system can be considerably improved, and moreover a much purer polymer can be obtained, if the metal halide is produced by conversion of a combination of an organic aluminium compound and an organic magnesium compound with the halogenating agent, for instance by a reaction with hydrogen chloride or an alkyl chloride.

According to the invention, a catalytic titanium component component useful for polymerization of alkenes-1 and for copolymerization of alkenes-1 with each other or with ethylene therefor contains a halogenated titanium compound, an electron donor and a metal halide obtained by conversion of an organic metal compound with a halogenating agent of the formula $RX_m$, wherein R is a hydrocarbon group, a hydrogen atom or a halogen atom, X is a halogen atom, and m is a whole number from 1–10, characterized in that the metal halide has been obtained by conversion of a combination of an organic aluminium compound and an organic magnesium compound with the halogenating agent to form the corresponding metal halide.

It is observed that from the Dutch 'Terinzagelegging' No. 7711518 a catalyst for manufacture of polyethylene is known which is prepared by reduction of tetra-butyl titanate with a mixed magnesium-aluminium alkyl, followed by de-activation of any surplus of magnesium alkyl with hydrogen chloride, after which a second quantity of tetra-butyl titanate is added. The Dutch 'Terinzagelegging' Mo. 7605544 describes a similar catalyst product, obtained by adding tetra-isopropyl titanate to the reaction product of a dibutyl magnesium-triethyl aluminium complex and hydrogen chloride. These known catalysts clearly differ from the catalytic titanium component according to the invention, while moreover these publications only give results about the polymerization of ethylene, whereby th stereospecificity of the catalyst is not involved.

The titanium component according to the invention improves the stereospecificity of the polymerization catalyst, at a very high level of activity. With this catalyst, polymers, for instance polypropylene, can be obtained with a very low halogen content, a very low titanium content, good particle size and good particle size distribution. As a result, the polymer has good processing properties and is little corrosive for the processing equipment.

The titanium component may contain any halogenated compound of bi-, tri- or tetravalent titanium, including compounds in which some of the titanium valencies have been taken up by atoms other than halogen atoms. The halogen in the halogenated titanium compound is preferably chlorine, but may also be bromine and/or iodine, for instance. Examples of suitable halogenated titanium compounds are $TiCl_3$, $TiCl_3 \cdot \frac{1}{3} AlCl_3$, $TiCl_4$, $TiBr_4$, $TiI_4$, $Ti(isobutoxy)_2Cl_2$, $Ti(phenoxy)Cl_3$ and $Ti(o$-methyl phenoxy$)Cl_3$.

$TiCl_3$ and $TiCl_4$ are highly suitable, especially $TiCl_4$.

For application in multi-stage polymerization processes, especially those in which more than half an hour is normally required for polymerization in the first stage before a second stage is started, it is of special advantage if the halogenated titanium compound used is a titanium halide phenolate of the formula $Ti_nX_aA_b$, in which X represents a halogen atom and A the acid radical of a phenol, n is a whole number of at least 1, and a and b are such numbers that a/n and b/n are both 1–3, on the understanding that (a+b)/n is equal to 3–4. The rate of decline in the activity of the catalyst is then substantially reduced, so that in multi-stage polymerization processes, for instance so-called block copolymerizations, in which in the first stage for instance for more than half an hour propylene, butylene-1, 4-methyl pentylene-1 or another alkene-1 with at least 3 carbon atoms per molecule is polymerized, possibly in the presence of a minor quantity of ethylene, after which in a second stage another monomer or a monomer mixture of a different composition is polymerized in the presence of the polymer formed in the first stage, so that blocks of different monomer composition may be present in one polymer molecule. the resultant proportion of such block copolymer is considerably higher.

The phenolate may be, for instance, the acid radical derived from unsubstituted phenol or from a phenol in which one or more alkyl groups or alkoxy groups with for instance 1–6 carbon atoms per group have been substituted, for instance cresol, methoxy phenol, xylenol, ethyl phenol, propyl phenol, octyl phenol, dibutyl phenol, cumyl phenol or naphthol. Cresolates and methoxy phenolates are particularly suitable, while cresolates offer the advantage of particularly high stereospecificity of the catalyst system. The benzene nucleus of the phenolate may contain other substituents which are non-detrimental in the polymerization reaction, such as one or more halide substituents. The phenolate groups may have, for instance, 6 to 18 carbon atoms, preferably 6–12 carbon atoms.

The halide:phenolate ratio in the titanium halide phenolate is preferably from 1:1 to 3:1. Besides the titanium halide phenolate, a phenolate-free titanium halide can be used in the halogenated titanium compound, if so desired. Preferably, a halide phenolate of tetravalent titanium is used. The value of n is mostly 1, but may also be 2 or higher, especially if a polyphenolate is used.

Specific examples of titanium halide phenolates to be used in the catalytic titanium component according to the invention are titanium (IV) trichloride monophenolate, titanium (IV) dichloride di-phenolate, titanium (IV) trichloride mono-p-cresolate, titanium(IV) dichloride mono-o-cresolate, titanium (IV) monochloride tri-1-naphtholate, titanium (IV) trichloride mono-(p-chlorophenolate), titanium (IV) tribromide mono-p-cresolate, titanium (IV) tribromide mono (xylenolate-isomer mixture) and titanium (IV) monoiodide trianisolate. Such compounds can be obtained for instance through conversion of the relevant titanium halide with the stoechiometric quantity of the relevant phenol, in which reaction the relevant hydrogen halide is liberated, or through double conversion of a titanium halide with a metal phenolate, for instance an alkali metal phenolate.

The catalytic titanium component according to the invention contains a metal halide obtained by conversion of a combination of an organic aluminium compound and an organic magnesium compound with the halogenating agent. In this metal halide the halogen:(aluminium+magnesium) atomic ratio is e.g. in the range (2.5–5):1, preferably in the range (4–5):1.

The conversion of the combination of an organic aluminium compound and an organic magnesium compound to form the corresponding metal halide may be effected, for instance, by precipitation of the metal halide from a solution of the organic metal compounds in a suitable solvent, by means of the halogenating agent. Suitable precipitation agents are, for instance, the hydrogen halides and aliphatic halogen compounds. The halogen in the halogenating agent is preferably chlorine, but may also be bromine or iodine, for instance.

The hydrogen halides may be introduced in the form of water-free gas, for instance.

Other suitable halogenating agents are aliphatic halogen compounds, for instance aliphatic halogenated hydrocarbons with, for instance, 1–8 carbon atoms per molecule, in particular alkyl chlorides. Examples are methyl chloride, methylene chloride, chloroform, ethyl bromide, ethylene dichloride, i-propyl chloride, n-butyl iodide, etc.

Other suitable precipitation agents are free halogens and interhalogen compounds, for instance $Cl_2$, $Br_2$, $I_2$, ICl, $ICl_3$ or BrCl.

The organic aluminium compound preferably contains one or more hydrocarbon groups bonded directly to the metal. The hydrocarbon groups preferably contain 1–10 carbon atoms. Examples are trialkyl or trialkenyl aluminium compounds, for instance triethyl aluminium, tripropyl aluminium, triisobutyl aluminium, triisoprenyl aluminium, trihexyl aluminium and trioctyl aluminium; dialkyl aluminium hydrides, for instance diethyl aluminium hydride or diisobutyl aluminium hydride; dialkyl aluminium halides, in particular a chloride or a bromide. diethyl aluminium chloride and bromide being particularly suitable, while di-n-butyl aluminium chloride or methyl-n-butyl aluminium chloride, for instance, may also be used; and (mono)alkyl aluminium dihalides. for instance ethyl aluminium dichloride, n-butyl aluminium dichloride or n-hexyl aluminium dibromide. If a halogen-containing organic aluminium compound is used, the halogen is preferably the same as that in the halogenating agent used. Trialkyl aluminium compounds are preferred.

The organic magnesium compound may be, for instance, a dialkyl magnesium or an alkyl magnesium halide. The hydrocarbon groups preferably contain 1–10 carbon atoms again. Examples are ethyl magnesium chloride, n-butyl magnesium chloride, i-propyl magnesium bromide, n-decyl magnesium iodide, di-n-butyl magnesium, di-i-amyl magnesium and di-n-octyl magnesium.

The conversion of the organic metal compounds into the metal halide may be effected in the absence of a solvent, but it is preferable for the metal halide to be precipitated from a solution of the organic metal compounds in a suitable solvent. Examples of suitable solvents are aliphatic, cycloaliphatic, aromatic and mixed aromatic/aliphatic hydrocarbons, with 3–8 carbon atoms per molecule, which are inert under the reaction conditions, for instance butane, i-butane, n-hexane, n-heptane, cyclohexane, benzene, toluene and xylenes. Halogenated hydrocarbons may also be used.

The temperature during the conversion may be, for instance, 250°–425° K., if a hydrogen halide is used as halogenating agent preferably about 290°–340° K. The pressure is not a critical factor and is, for instance, 10–1000 kPa. The reaction time may e.g. be 0.5–10 hours, preferably 1–4 hours.

In a suitable mode of realization of the process according to the invention, first an alkyl halide, for instance n-butyl chloride, is converted into the alkyl magnesium halide with metallic magnesium in a hydrocarbon solvent, for instance n-heptane, in a manner known in itself, and subsequently or simultaneously a suitable aluminium compound, for instance a trialkyl aluminium such as tri-n-butyl aluminium, is applied, so that a dissolved complex consisting of an organoaluminium compound and an alkyl magnesium compound in formed. Instead of a trialkyl aluminium, it is also possible to add another organic aluminium compound, for instance an alkoxy aluminium compound, an alkyl aluminium halide or the aluminium salt of an organic acid, or metallic aluminium or an aluminium halide, for instance aluminium chloride, which is converted in situ into an organic aluminium compound forming the complex. The resultant solution of an organoaluminium/alkyl magnesium complex is subsequently treated with a gaseous hydrogen halide, for instance hydrogen chloride, or with an alkyl halide so that the metal halide is precipitated.

The aluminium:magnesium molar ratio in the combination of organometal compounds used as starting material may be, for instance, 1:99 to 1:1. Other molar ratios are possible, but are not advantageous. This molar ratio is preferably 1:20 to 1:3, more in particular 1:10 to 1:4. When using combinations of organometal compounds with molpercentages organoaluminium compound with respect to organomagnesium compound rising above 35, the activity of the obtained catalyst systems decreases rapidly with increasing molpercentage.

If so desired, it is possible to incorporate further metal ions in the metal halide, for instance sodium, tin, silicon or germanium.

In a highly suitable mode of realization, the titanium component according to the invention is prepared by converting a combination of an organic aluminium compound and an organic magnesium compound with the halogenating agent into the corresponding metal halide, which is converted with a titanium halide compound of tetravalent titanium.

It is observed that after the combination of the titanium halide compound with the metal halide used as carrier, the tetravalent titanium may, if so desired, be reduced to titanium of a lower valency, for instance tri- or bivalent titanium, in a known manner, so that the titanium component used need not necessarily contain tetravalent titanium.

Besides the halogenated titanium compound and metal halide used as carrier, the titanium component contains an electron donor. It is assumed that this donor is present in the form of a complex with the halogenated titanium compound. The electron donor used may be one or more of the compounds used in the known manner in similar catalyst systems, for instance oxygen containing electron donors such as water, alcohols, phenols, ketones, aldehydes, acid halides, carboxylic acids, esters, ethers and amides, or nitrogen-containing electron donors such as ammonia, amines, nitriles, isocyanates and nitro compounds.

Specific examples of suitable electron donors are alcohols with 1–18 carbon atoms per molecule, for instance methanol, ethanol, propanol, hexanol, stearyl alcohol, benzyl alcohol, phenyl ethyl alcohol or cumyl alcohol; phenols with 6–18 carbon atoms per molecule, for instance phenol, cresol, xylenol, ethyl phenol, propyl phenol, octyl phenol, dibutyl phenol, cumyl phenol or naphthol; ketones with 3–15 carbon atoms per molecule, for instance acetone, methyl ethyl ketone, methyl isobutyl ketone, acetophenone or benzophenone; aldehydes with 2–15 carbon atoms per molecule, for instance ethanal, propanal, heptanal, benzaldehyde, tolualdehyde or naphthaldehyde; acid halies with 2–15 carbon atoms per molecule, for instance acetyl chloride, benzoyl chloride or toluyl chloride; acid amides with 2–15 carbon atoms per molecule, for instance formamide, acetamide, benzamide or toluamide; amines with 2–18 carbon atoms per molecule, for instance methylamine, ethylamine, diethylamine, triethylamine, tributylamine, piperidine, tribenzylamine, aniline, pyridine, picoline or ethylene diamine; nitriles with 2–15 carbon atoms per molecule, for instance acetonitrile, benzonitrile or tolunitrile; or nitro compounds, for instance nitrobenzene. Preference is given to ethers with 2–20 carbon atoms per molecule, for instance dimethyl ether, diethyl ether, di-n-butyl ether, di-i-amyl ether, tetrahydrofuran, anisole or diphenyl ether, and in particular organic esters with 2–40, in particular 2–18 carbon atoms per molecule. The acid component of the ester mostly contains 1–9 carbon atoms per molecule or is a natural fatty acid, while the alcohol component mostly contains 1–6 carbon atoms per molecule.

Examples of suitable esters are methyl formate, cyclohexyl formate, ethyl acetate, vinyl acetate, amyl acetate, 2-ethyl hexyl acetate, cyclohexyl acetate, ethyl propionate, amyl propionate, methyl butyrate, ethyl valeriate, methyl chloroacetate, ethyl di-chloroacetate, methyl methacrylate, ethyl acrylate, n-butyl acrylate, ethyl crotonate, dimethyl maleate, ethyl cyclohexane carboxylate, methyl benzoate, ethyl benzoate, i-butyl benzoate, octyl benzoate, cyclohexyl benzoate, phenyl benzoate, benzyl benzoate, phenyl ethyl benzoate, methyl toluate, ethyl toluate, i-amyl toluate, methyl anisate, ethyl anisate, $\gamma$-butyrolacton, $\epsilon$-caprolacton, coumarin, phthalide and ethylene carbonate. Particular preference is given to esters derived from aromatic acids, in particular esters of benzoic acid, substituted or not with alkyl or alkoxy groups. Alkyl esters with 1–4 carbon atoms per alkyl group, in particular methyl or ethyl esters of benzoic acid, o- or p-toluene carboxylic acid, p-methoxy benzoic acid or phtalic acid, are preferred in particular.

The various constituent elements of the titanium component may be combined in any known manner. Preferably, first a complex of the titanium halide compound and the electron donor is prepared.

The complexes of the titanium halide compound and the electron donor may be obtained in any known manner, for instance by bringing the components of the complex into contact with each other.

The titanium halide compound may be applied to the carrier material in any known manner, for instance by simple mixing, preferably by grinding together, for instance in a ball mill, a vibration mill or beater mill. The mixing may be done in the co-presence of an anorganic or organic filler, for instance lithium chloride, calcium carbonate, calcium chloride, chromium(II)-chloride, barium chloride, sodium sulphate, sodium carbonate, titanium dioxide, sodium tetraborate, calcium orthophosphate, calcium sulphate, barium carbonate, aluminium sulphate, borium trioxide, aluminium oxide, silicon oxide, polyethylene, polypropylene or polystyrene. The filler may also have been taken up in the carrier material beforehand. It is possible to first form a complex of the titanium halide compound and the electron donor and apply it to the carrier, or also to first apply the non-complexed titanium halide compound to the carrier and add the electron donor afterwards, either before or after addition of the organoaluminium component used in the complete catalyst. It may be advantageous to treat the titanium component with a halogen or an interhalogen compound, for instance bromium, preferably in the absence of an inactive solvent.

The titanium content of the titanium component on the carrier usually amounts to between 0.1 and 10% by wt. The titanium:magnesium:aluminium weight ratio preferably is 1:(0.5–20):(0.1–5), more in particular 1:(0.5–2.5):(0.2–1). Preferably, the electron donor is present in the titanium component in a quantity of for instance 0 to 5 molecules per titanium atom. A typical example of the composition of the titanium component, although varying in dependence on the circumstances of the catalyst preparation, is: 2–10% by wt. of titanium, 16–25% by wt. of magnesium, 1.5–10% by wt. of aluminium, 45–65% by wt. of halogen and 5–25% by wt. of the electron donor.

The titanium component in the prepared polymerization catalyst is used in combination with an organometallic component derived from a metal of one of the groups I–III of the Periodic System with a hydrocarbon radical bonded directly to the metal.

Examples are trialkyl aluminium compounds, alkyl aluminium alkoxides, alkyl aluminium hydrides, alkyl aluminium halides, dialkyl zinc compounds and dialkyl magnesium compounds, of which the organoaluminium compounds are particularly suitable. Examples of the organoaluminium compounds are trialkyl or trialkenyl aluminium compounds, for instance triethyl aluminium, tripropyl aluminium, triisobutyl aluminium, tri-isoprenyl aluminium, trihexyl aluminium and trioctyl aluminium; alkyl aluminium compounds in which a number of the aluminium atoms are connected via an oxygen or nitrogen atom, for instance $(C_2H_5)_2AlOAl(C_2H_5)_2$, $(i-C_4H_9)_2AlOAl(i-C_4H_9)_2$ or $(C_2H_5)_2AlN-HAl(C_2H_5)_2$: dialkyl aluminium hydrides such as diethyl aluminium hydride or diisobutyl aluminium hydride; dialkyl aluminium halides, in particular a chloride or a bromide, diethyl aluminium chloride and bromide being particularly suitable, while also other dialkyl aluminium halides with preferably 1–10 carbon atoms in the alkyl group, such as for instance di-n-butyl aluminium chloride and methyl-n-butyl aluminium chloride, can be used; and dialkyl aluminium alkoxides or phenoxides, for instance diethyl ethoxy aluminium or diethyl phenoxy aluminium. The trialkyl aluminium compounds deserve most preference.

The organometal compound may also contain a trialkyl aluminium compound as well as a dialkyl aluminium halide or a mixture of a dialkyl magnesium compound and a mono-alkyl aluminium dihalide. The alkyl groups of the organoaluminium compounds preferably contain 1–10 carbon atoms each. The alkyl groups of the dialkyl magnesium compound preferably contain 1–10 carbon atoms each or are a palmityl or stearyl group. Examples of suitable dialkyl magnesium compounds are diethyl magnesium, di-n-butyl magnesium, di-n-hexyl magnesium and di-n-octyl magnesium. The mono-alkyl aluminium dihalide preferably is a chloride or a bromide. Ethyl aluminium dichloride or bromide is particularly suitable, but also other monoalkyl aluminium dihalides with preferably 1–10 carbon atoms in the alkyl group may be used, such as isopropyl aluminium dichloride, n-butyl aluminium dibromide or n-octyl aluminium dichloride. The molar ratio between the dialkyl magnesium compound and the monoalkyl aluminium dihalide may be between, for instance, 0.1 and 1, preferably between 0.3 and 0.6. Too high a mole ratio leads to insufficiently stereospecific catalysts, while insufficient catalyst activity results if it is too low.

The organometal component preferably contains a complex of an organic metal compound, in particular a trialkyl aluminium compound, with an ester of an oxygen-containing organic acid. Suitable esters are the same esters as may be used in the titanium halide component, in particular again the esters of aromatic carboxylic acids. For brevity's sake, reference is made to the foregoing. preferably, part of the organic metal compound, for instance 50–80%, is present in a non-complex condition.

The Al:Ti atom ratio is generally between 10 and 1000; the molecule-atom ratio of Lewis base bonded in total in the catalyst to Ti is in general between 5 and 500.

The method according to the invention is used in particular in stereospecific polymerization of alkenes-1 with 3–6 carbon atoms per molecule, such as propylene, butylene-1, 4-methyl pentylene-1 and hexylene-1, and in the copolymerization of these alkenes-1 with each other and/or with ethylene. Copolymers with random arrangement of the various monomer units as well as block copolymers can be manufactured. If ethylene is used as a comonomer, it is normally used in minor quantities, for instance 30% by wt. at most, more in particular between 1 and 15% by wt., is incorporated in the polymer. The process according to the invention is of importance in particular for manufacture of isotactic polypropylene, random copolymers of propylene with minor quantities of ethylene and block copolymers of propylene and ethylene. For the manufacture of block copolymers, any desired sequence of monomer addition may be applied.

The circumstances under which the polymerization reaction with the catalytic titanium component according to the invention is carried out do not deviate from those known in the art. The reaction may be carried out in the gas phase or in the presence of a dispersant. The dispersant may be inert or also a monomer in liquid form. Examples of suitable dispersants are aliphatic, cycloaliphatic, aromatic and mixed aromatic/aliphatic hydrocarbons with 3–8 carbon atoms per molecule, such as propylene, butylene-1, butane, isobutane, n-hexane, n-heptane, cyclohexane, benzene, toluene and the xylenes.

In the case of polymerization in the liquid phase, it is preferable for the concentration of the titanium component to be set at 0.001–0.5 mmole, calculated as titanium atom, and the concentration of the organometal compound at about 0.1–0.50 mmole, both per litre of liquid phase.

The polymerization temperature is mostly between 190° and 475° K., preferably between 310° and 375° K. The pressure may be between 100 and 3000 kPa, for instance.

If so desired, it is possible to control the molecular weight of the polymer during the polymerization process, for instance through the presence of hydrogen or another known molecular weight regulator.

The polymerization reaction may be carried out as a batch process or as a continuous process.

It has been found that a further considerable reduction of the catalyst residues content, especially that of halogen, can be achieved by carrying out the separation of the solid polymer after completion of the polymerization under exclusion of the air.

The invention will now be elucidated by means of the following non-restrictive examples and the comparative experiment.

EXAMPLES AND COMPARATIVE EXPERIMENT

EXAMPLE I

A. Preparation of the catalytic titanium component

At 273° K. 6.5 ml of water-free ethyl benzoate (EB), dissolved in 75 ml of water-free gasoline, is introduced into a solution of 5 ml of $TiCl_4$ in 125 ml of gasoline, flushed with dry nitrogen. The resultant precipitate of $TiCl_4.EB$ is separated off by filtration and dried.

100 ml of a solution containing 0.3 mole of dibutyl magnesium and 0.03 mole of triethyl aluminium per litre of hexane is introduced into a three-neck flask, flushed with nitrogen and provided with a mechanical agitator and a reflux condensor. A flow of dry HCl gas is introduced, resulting in the formation of a yellowish precipitate. During the reaction, the temperature rised. The gas flow is maintained for 1 hour after the temperature has reached its maximum.

The precipitate of metal chloride is separated off by filtration, washed with hexane and dried. The composition of this product is: 20.1% of Mg, 1.9% of Al, 61.1% of Cl and 16.5% of organic material (in % by wt.).

3.1 g of the metal chloride obtained and 3.4 g of the $TiCl_4.EB$ complex obtained are successively introduced into a stainless steel ball mill with 8 balls. The mixture is ground for 17 hours in a nitrogen atmosphere.

B. Polymerization 1.3 l of gasoline, 2.5 ml of triisobutyl aluminium (TIBA), 0.25 ml of ethyl benzoate and 0.07 g of the titanium component obtained as described under A are introduced into a stainless steel reactor, flushed with dry nitrogen and provided with a mechanical agitator. The pressure is raised to and maintained at 700 kPa by leading in propylene. The temperature is raised to and maintained at 333° K. After a polymerization time of 2 hours, the supply of propylene is stopped, the pressure is released and the polymer suspension is removed from the reactor. The polymer is separated off by filtration under exclusion of the air.

The polymerization activity amounts to 1110 g PP/mmole Ti.h and the soluble polymer content is 4.0%. The average particle diameter ($d_{50}$) is 700 μm. The polymer contains 7 wt. ppm of titanium and 115 wt. ppm of chlorine. Pp stands for polypropylene here.

EXAMPLE II

The polymerization is carried out in a manner analogous to that in example IB, but now 0.5 Nl of $H_2$ is introduced into the reactor prior to supplying propylene.

The polymerization activity amounts to 1070 g PP/mmole Ti.h and the soluble polymer content is 4.3%. The average particle diameter is 080 μm.

EXAMPLE III

The polymerization is carried out in a manner analogous to that in example IB, but now 0.45 ml of ethyl benzoate is used in the TIBA co-catalyst. The polymerization activity now amounts to 660 g Pp/mmole Ti.h and the soluble polymer content is 2.4%. The average particle diameter ($d_{50}$) is 590 μm.

Comparative experiment

A. Preparation of the titanium component

Anhydrous $MgCl_2$, commercially available, is treated with CO and $Cl_2$ at 670° K. in order to remove residual $H_2O$ and MgO. 3.0 g of this $MgCl_2$ and 3.4 g of $TiCl_4$.EB are ground for 17 hours in a stainless steel ball mill in an atmosphere of dry nitrogen.

B. Polymerization

The polymerization is carried out in a manner analogous to that in example IB, but now 0.075 g of the titanium component obtained as described under A of this comparative experiment is used.

The polymerization activity amounts to 810 g PP/mmole Ti.h and the soluble polymer content is 6.8%. The average particle diameter ($d_{50}$) amounts to 400 μm. The titanium content of the polymer filtered off amounts to 12 wt. ppm and the chlorine content is 200 wt. ppm.

EXAMPLE IV

A. Preparation of the titanium component 100 ml of a solution containing 0.3 mole of dibutyl magnesium and 0.06 mole of triethyl aluminium per litre is introduced into a three-neck flask flushed with nitrogen and provided with a mechanical agitator and a reflux condensor. A flow of dry HCl gas is introduced, resulting in the formation of a yellowish precipitate. During the reaction, the temperature rises and the gas flow is maintained for one hour after the temperature has reached its maximum. The precipitate of metal chloride is separated off by filtration, washed and dried. The composition of this product is 19.4% of Mg, 3.6% of Al and 62.3 % of Cl.

3.2 g of the metal chloride obtained and 3.4 g of the $TiCl_4$. ethyl benzoate complex are introduced into a stainless steel ball mill. This mixture is ground for 17 hours in a nitrogen atmosphere.

B. Polymerization

The polymerization is carried out in a manner analogous to that in example IB, but now 0.065 g of the titanium component of example IV A is used.

The polymerization activity amounts to 1170 g PP/mmole Ti.h and the dissolved polymer content is 4.3%. The average particle diameter ($d_{50}$) of the polymer is 700 μm. The titanium content of the polymer filtered off amounts to 7 wt. ppm and the chlorine content is 110 wt. ppm.

EXAMPLE V

A. Preparation of the titanium component

The metal chloride is prepared in the same manner as described in example IV A, but now 0.075 mole of triethyl aluminium is used.

3.1 g of the metal chloride obtained and 3.4 g of $TiCl_4$. ethyl benzoate are introduced into a stainless steel ball mill. This mixture is ground for 17 hours in a nitrogen atmosphere.

B. Polymerization

The polymerization is carried out in a manner analogous to that in example IB, but now 0.068 g of the titanium component of example V A is used.

The polymerization activity amounts to 1560 g PP/mmole Ti.h and the dissolved polymer content amounts to 4.1%. The average particle diameter of the polymer is 725 μm.

EXAMPLE VI

A. Preparation of the titanium component

The metal chloride is prepared in the same manner as described in example IV A, but now 0.09 mole of triethyl aluminium is used.

3.2 g of the metal chloride obtained and 3.4 g of $TiCl_4$.ethyl benzoate are introduced into a stainless steel ball mill. This mixture is ground for 17 hours in a nitrogen atmosphere.

B. polymerization

The polymerization is carried out in a manner analogous to that in example IB, but now 0.070 g of the titanium component of example VI A is used.

The polymerization activity amounts to 1400 g PP/mmole Ti.h and the dissolved polymer content is 4.3%. The average particle diameter of the polymer is 700 μm. The titanium content of the polymer filtered off amounts to 6 wt. ppm and the chlorine content is 75 wt. ppm.

EXAMPLE VII 1.2 l of gasoline, 2.5 ml of TIBA, 0.25 ml of ethyl benzoate, 0.070 g of the titanium component from example VI A and 250 N ml of hydrogen are introduced into a stainless steel reactor, flushed with dry nitrogen and provided with a mechanical agitator. The pressure is raised to and maintained at 700 kPa by leading in propylene. The temperature is raised to and maintained at 333° K. After a polymerization time of 2 hours, the pressure is released to 100 kPa, 500N ml of hydrogen are added, and then a mixture of 17 vol. % of propylene and 83 vol. % of ethylene is led in, whereby the pressure is raised to 150 kPa. The polymerization is continued during 2 hours at 333° K. and 150 kPa. Thereafter the polymerization is stopped and the polymer isolated by filtration under exclusion of the air.

360 g of polymer are obtained, with an ethylene content of 13 wt. % (measured by means of infrared spectroscopy); the soluble polymer content amounts to 4.1% with respect to total polymer formed.

We claim:

1. A titanium-containing catalyst component useful for the polymerization of 1-alkenes, and for the copolymerization of 1-alkenes with each other or with ethylene, said titanium catalyst component containing a halogenated titanium compound, an ester, and a magnesium/aluminum halide, and prepared by (1) forming a mixture of (i) an organo aluminum compound and (i) an organo manesium compound, in an aluminum:magnesium molar ratio of between about 1:10, and reacting such mixture with a halogenating agent of the formula RX, in which formula R is a hydrogen or a halogen atom and X is a halogen atom, to form a solid magnesium/aluminum halide having an aluminum:magnesium molar ratio of at least about 1:14, (2) independently forming a solid complex of a titanium IV halide and an ester and then (3) forming an intimate solid admixture of said magnesium/aluminum halide with said titanium IV halide/ester complex to obtain said titanium catalyst component.

2. A titanium-containing catalyst component useful for the polymerization of 1-alkenes, and for the copolymerization of 1-alkenes with each other or with ethylene, said titanium catalyst component containing a halogenated titanium compound, an ester, and a magnesium/aluminum halide, and prepared by (1) forming a mixture of (i) an organo aluminum compound which contains at least one hydrocarbon radical having 1-10 carbon atoms and bounded directly to the aluminum atom, and (ii) a dialkyl magnesium or an alkyl magnesium chloride having from 1 to 10 carbon atoms per alkyl radical, in an aluminum:manesium molar ratio of between about 1:10 and 1:1, and reacting such mixture with a halogenating agent of the formula RX, in which formula R is a hydrogen or a halogen atom and X is a halogen atom, to form a solid magnesium/aluminum halide having an aluminum:magnesium molar ratio of at least about 1:14, (2) independently forming a solid complex of a titanium IV halide and an ester and then (3) forming an intimate solid admixture of said magnesium/aluminum halide with said titanium IV halide/ester complex to obtain said titanium catalyst component.

3. A titanium-containing catalyst component useful for the polymerization of 1-alkenes, and for the copolymerization of 1-alkenes with each other or with ethylene said titanium catalyst component containing a chlorinated titanium compound, an ester, and a magnesium/aluminum halide, and prepared by (1) forming a mixture of (i) an organo aluminum compound which contains at least one hydrocarbon radical having 1-10 carbon atoms and bonded directly to the aluminum atom, and (ii) a dialkyl magnesium or an alkyl magnesium chloride having from 1 to 10 carbon atoms per alkyl radical, in an aluminum:magnesium molar ratio of between about 1:10 and 1:1, and reacting such mixture with a halogenating agent of the formula RX, in which formula R is a hydrogen or a halogen atom and X is a halogen atom, to form a solid magnesium/aluminum halide having an aluminum:magnesium molar ratio of at least about 1:14, (2) independently forming a solid complex of $TiCl_4$ and an ester and then (3) forming an intimate solid admixture of said magnesium/aluminum halide with said $TiCl_4$/ester complex to obtain said titanium catalyst component.

4. Titanium-containing component according to any one of the claims 1, 2 or 3, wherein the acid component of the ester contains 1-9 carbon atoms per molecule or is a natural fatty acid, and wherein the alcohol component of the ester contains from 1 to 6 carbon atoms per molecule.

5. A titanium catalyst component according to any one of the claims 1, 2 or 3 wherein said ester is an ester of an aromatic acid.

6. A titanium catalyst component according to claim 5, wherein the ester is an alkyl ester, with from 1 to 4 carbon atoms per alkyl group, of benzoic acid, ortho- or para-toluene carboxylic acid, para-methoxy benzoic acid or phthalic acid.

7. A titanium-containing catalyst component according to any one of claims 1, 2, or 3 wherein said halogenating agent is a hydrogen halide.

8. A titanium-containing catalyst component according to claim 7 wherein said halogenating agent is hydrogen chloride.

9. A titanium-containing catalyst component according to any one of claims 1, 2, or 3 wherein titanium is present in an amount of between 0.1 and 10 percent by weight of said titanium catalyst component.

10. A titanium-containing catalyst component according to claim 9 wherein titanium is present in an amount of between 2 to 10 percent by weight of said titanium catalyst component.

11. A titanium-containing catalyst component according to any one of claims 1, 2, or 3 wherein said ester has 2-40 carbon atoms per molecule.

12. A titanium-containing catalyst component according to claim 11 wherein said ester has 2-18 carbon atoms per molecule.

13. A titanium-containing catalyst component according to any one of claims 1, 2, or 3 wherein said intimate solid admixture is formed by grinding or milling said magnesium/aluminum halide with said titanium IV halide/ester complex.

14. A process for the preparation of a titanium-containing catalyst component consisting essentially in (1) converting a combination of an organo aluminum compound and an organo magnesium compound, having an aluminum:magnesium molar ratio of between about 1:10 and 1:1, with a halogenating agent of the formula RX, wherein R represents hydrogen or a halogen atom and X is a halogen atom, to form a solid magnesium/aluminum halide having a aluminum:magnesium molar ratio of at least about 1:14, and (2) independently forming a solid complex of titanium IV halide and an ester and then (3) forming an intimate solid admixture of said magnesium/aluminum halide with said titanium IV halide/ester complex to obtain said titanium catalyst component.

15. Process according to claim 14, wherein said halogenating agent is a hydrogen halide.

16. Process according to claim 14, wherein said hydrogen halide is hydrogen chloride.

17. Process according to claim 14, wherein said combination of an organo aluminum compound and an organo magnesium compount is the reaction product of an alkyl halide with metallic magnesium, converted in a hydrocarbon solvent, with subsequent or simultaneous addition of an organic aluminum compound, resulting in the formation of a complex consisting essentially of an organoaluminum compound and an alkyl magnesium compound.

18. Process according to claim 14, wherein said titanium component is prepared by first forming a complex of the titanium halide compound and the ester and thereafter grinding this solid complex with said magnesium/aluminum/halide complex.

19. A method for the polymerization of alkenes-1 and for the copolymerization of alkenes-1 with each other or with ethylene in the presence of a dispersant and a catalyst composed of a titanium component and an organo-metallic component of a metal of one of the groups I—III of the Periodic System having a hydrocarbon radical bonded directly to said metal, the improvement consisting essentially in using as said titanium component a titanium component having a halogenated titanium compound, an electron donar, and a magnesium/aluminum halide, and prepared by (1) forming a mixture of (i) an organo aluminum compound which contains at least one hydrocarbon radical having 1–10 carbon atoms and bonded directly to the aluminum atom, and (ii) a dialkyl magnesium magnesium or an alkyl magnesium chloride having from 1 to 10 carbon atoms per alkyl radical, having an aluminum:magnesium molar ratio of between about 1:10 and 1:1, and reacting such mixture with a halogenating agent of the formula RX, in which formula R is a hydrogen or a halogen atom and X is a halogen atom, to form a solid magnesium/aluminum halide having an aluminum:magnesium molar ratio of at least about 1:14, (2) independently forming a solid complex of a titanium IV halide and an ester and then (3) forming an intimate solid admixture of said magnesium/aluminum halide with said titanium IV halide/ester complex to obtain said titanium catalyst component.

20. Method according to claim 19, wherein said organometallic component also contains a complex of an organo metal compound with an ester of an oxygen-containing organic acid.

21. Method according to claim 19, wherein upon completion of said polymerization insoluble polymer is separated from the dispersant with exclusion of the air.

* * * * *

UNITED STATES PATENT AND TRADEMARK OFFICE
CERTIFICATE OF CORRECTION

PATENT NO. : 4,670,525
DATED : June 2, 1987
INVENTOR(S) : Loontjens, et al

It is certified that error appears in the above-identified patent and that said Letters Patent is hereby corrected as shown below:

Column 9, Line 17: "Pp" should be -- PP --

Column 9, Line 25: "080" should be -- 680 --

Column 11, Line 16: "(i)" should be -- "(ii)" --

Column 11, Line 16: "manesium" should be --magnesium --

Column 11, Line 18: after "1:10" insert -- and 1:1, --.

Column 11, Line 43: "manesium" should be -- magnesium --

Signed and Sealed this

Twenty-fourth Day of November, 1987

*Attest:*

DONALD J. QUIGG

*Attesting Officer*  *Commissioner of Patents and Trademarks*